Feb. 4, 1958 F. M. MURPHY 2,822,519
IDENTIFIER AND TESTER FOR ELECTRICAL CIRCUITS
Filed Feb. 9, 1954 3 Sheets-Sheet 1
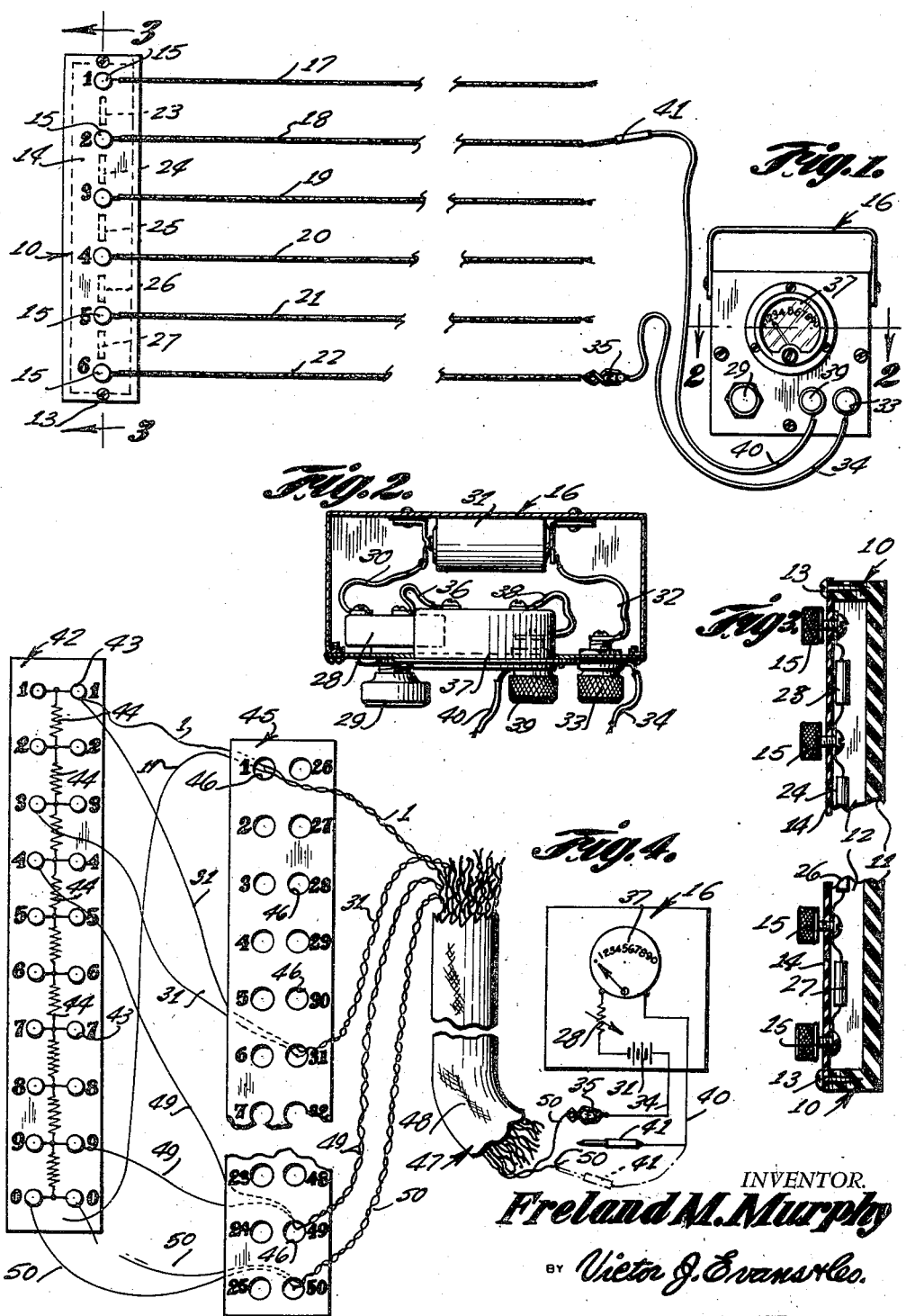
INVENTOR.
*Freland M. Murphy*
BY *Victor J. Evans & Co.*
ATTORNEYS

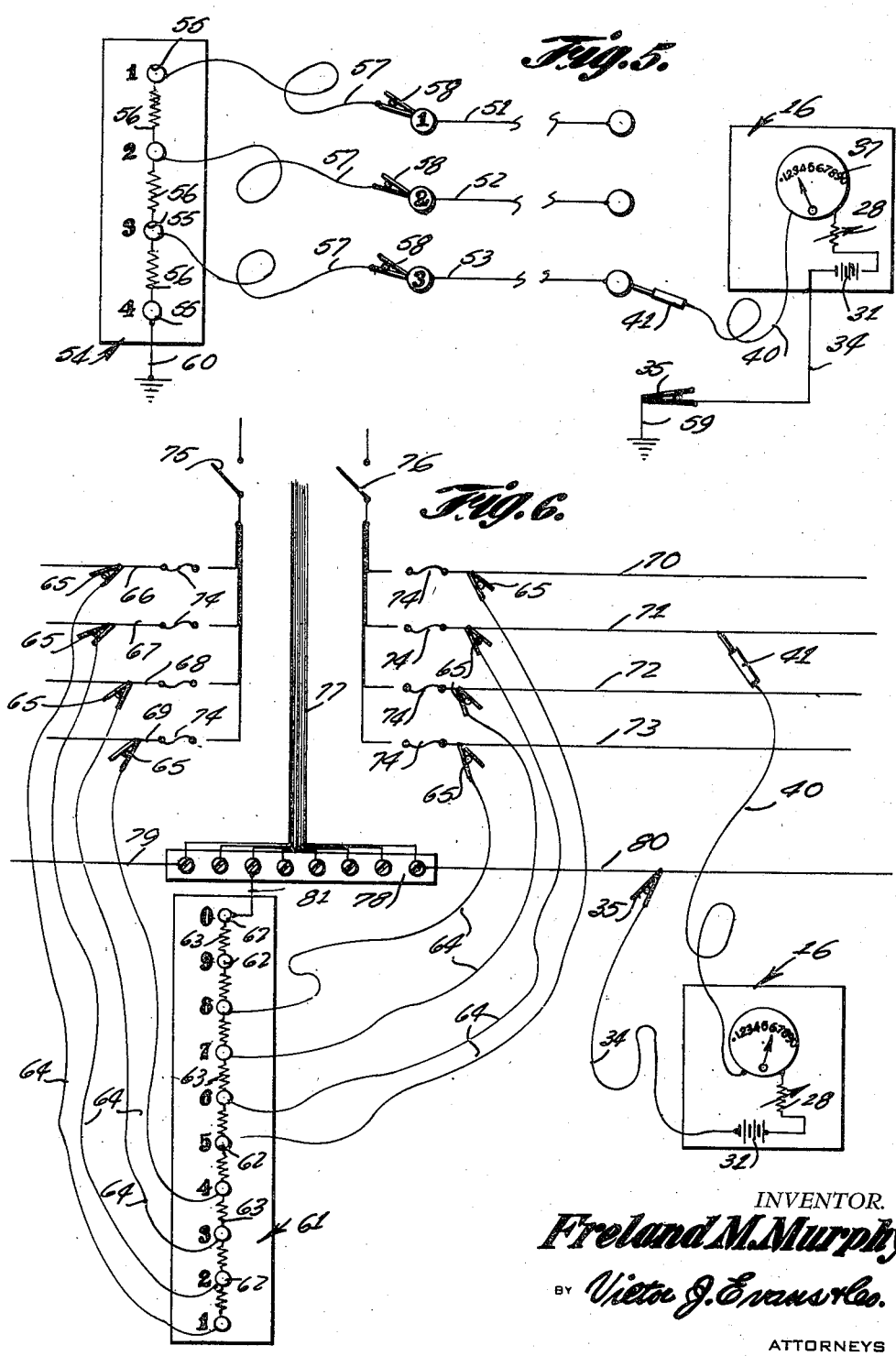

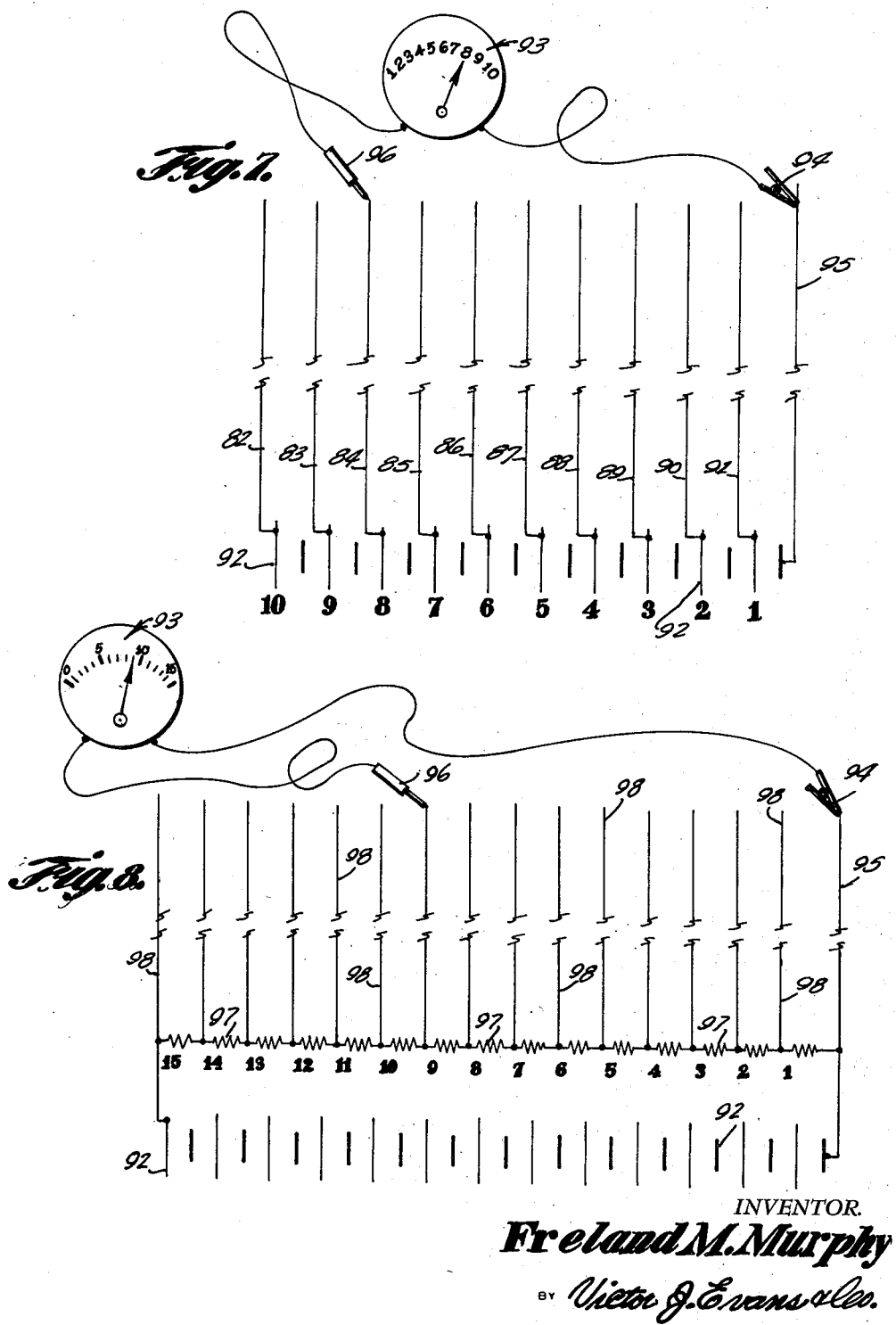

United States Patent Office 2,822,519
Patented Feb. 4, 1958

2,822,519

IDENTIFIER AND TESTER FOR ELECTRICAL CIRCUITS

Freland M. Murphy, Houston, Tex.

Application February 9, 1954, Serial No. 409,141

1 Claim. (Cl. 324—66)

This invention relates to an identifier and tester for electrical circuits.

The object of the invention is to provide a system for permitting one person to identify and test electric conductors or systems.

Another object of the invention is to provide known values of resistors and a meter with a source of direct current to identify circuits that have been connected to a series of the resistors in such a manner that when the meter, which may be an ohmmeter, is connected between a common return circuit and one of the conductors to be identified, the meter will read a value that will identify the conductor under test since no two of the conductors will yield the same reading on the ohmmeter.

A still further object of the invention is to provide a circuit identifier and tester which uses known resistances that are connected to circuits to be identified in such a manner that no two circuits, when tested, will yield the same reading or combination of readings on the ohmmeter as the ohmmeter is connected to the circuits in turn.

A further object of the invention is to porvide a circuit identifier and tester which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a view illustrating one form of the invention wherein five resistors are connected between a tracer conductor or a common ground and each of the conductors to be identified and tested.

Figure 2 is a sectional view taken on the line 2—2 of Figure 1.

Figure 3 is a sectional view taken on the line 3—3 of Figure 1.

Figure 4 is an illustration of a modification showing a standard tag board with numbered holes wherein the assembly is used on cables consisting of paired circuits.

Figure 5 is a view showing another modification wherein conductors in a three wire circuit are identified wherein such wires may be part of a house wiring system or the like.

Figure 6 is a view illustrating a further modification showing how a multiple circuit wiring system in a home or plant can be connected to the circuit identifier and tester so that any of the various leads can be readily identified at any point where they are accessible without the necessity of connecting up dangerous voltage used to furnish electrical power over these same wires.

Figure 7 is an illustration of a further modification showing a circuit identifier and tester wherein the circuits are differentiated by having been connected to sources of electrical voltages of different magnitudes so that when the circuits are tested by measuring the voltage thereon, the circuits can be identified by their respective voltage readings.

Figure 8 is a view similar to Figure 7, but showing a further modification wherein resistances are connected between the circuits being tested.

Referring in detail to Figures 1, 2 and 3 of the drawings, the numeral 10 designates a terminal board which can be made of any suitable material such as plastic, and the terminal board 10 includes a base 11 that is provided with a recess or chamber 12, Figure 3. A cover 14 may be secured to the base 11 by suitable securing elements such as the screws 13.

Projecting outwardly from the cover 14 is a plurality of terminal or binding posts 15, and the numeral 16 designates a meter unit for use with the present invention.

The numerals 17, 18, 19, 20, 21 and 22 designate wires or conductors which are connected to the binding posts 15. The wires 17, 18, 19, 20 and 21 may be the wires which are to be identified and tested, while the wire or line 22 is a tracer or common ground wire. A resistor 23 is electrically connected between an adjacent pair of of posts 15, and there is further provided resistors 24, 25, 26, and 27 which are electrically connected between the other adjacent pairs of binding posts 15. Arranged adjacent each binding post 15 is a number and it will be seen in Figure 1 that there are the numerals 1, 2, 3, 4, 5 and 6.

Arranged within the meter unit 16 is a variable resistor 28, Figure 2, and a knob 29 is provided for controlling the resistor 28. A wire 30 leads from the resistor 28 to a suitable source of current such as the batteries 31, and a line 32 also leads from the batteries 31 to a terminal 33. A line 34 leads from the terminal 33 to an alligator clip 35 which is adapted to be connected to an end of the tracer line 22, as shown in Figure 1. A line 36 also connects the variable resistor 28 to the dial mechanism 37 which includes a movable pointer and a scale having numerals that correspond to the numerals on the terminal board 10. A line 38 connects the dial mechanism 37 to a terminal 39, and a line 40 leads from the terminal 39 to a test pick 41 which is adapted to be arranged in engagement with one of the lines 17, 18, 19, 20 or 21 that are to be identified or tested.

In the example shown in Figures 1, 2 and 3 the conductors 17—21 are connected to the binding post terminals 15 which are numbered to correspond to numbers that are used to identify the circuits to be tested. The resistors 23—27 that are used are of a value that a recognizable reading will be observed when the meter 16 is connected to that conductor and this reading on the meter 16 will differentiate that conductor from the others in the group. The ground return circuit which is a readily identifiable tracer line 22 is used as a common return circuit for testing all the other circuits. One side of the testing meter 16 is connected to the tracer line 22 by a line 34. The battery 31, the variable resistance 28 and the meter 16 are connected in series between the test clip 35 and the test pick 41. To calibrate the meter 16, the test pick 41 is brought into contact with the test clip 35 and the resistor 28 is adjusted so that a full scale reading will be observed on the meter. This adjustment compensates for loss of voltage in the battery 31 as the latter becomes old. With the same variable resistor, compensation can be made in certain applications, as explained later, for the resistance along the conductors themselves.

If the test pick 41 is now removed from contact with the test clip 35, and the test pick 41 is brought into contact with one of the conductors to be tested such as the conductor 18, the meter 16 will read a value that will identify the conductor as the one connected to the resistor network at a particular point. For example if the meter reads two, then the circuit under test is circuit number two. In the example shown in Figure 1, and in the previous description thereof, it is assumed that the resistance of the conductors under test is very small compared with that of the resistors used in the network. However, this particular form of tester can easily be adapted to testing circuits in airplane wiring systems, house wiring systems, electrical computer systems, and other systems where multiplicity of wires makes positive identification a laborious and tedious task.

Referring to Figure 4 of the drawings there is shown a modified form or specialized form of the circuit identifier and tester which can be used for one man testing of telephone and similar cables where the circuits to be tested are in pairs. The assembly includes a terminal board 42 that has a plurality of binding posts 43 extending therefrom, and there is further provided on the board 42 a resistance network which includes a plurality of resistors 44 that are connected between the posts 43. The meter unit 16 is shown diagrammatically and may have the same construction as the previously described meter unit shown in Figures 1 and 2. A tag board 45 may be used with this assembly, and the tag board 45 is provided with a plurality of openings or holes 46 which each have a number arranged therealong or alongside.

In the assembly shown in Figure 4 each circuit is paired with an easily identifiable mate by being twisted together with the mate for the entire length of the cable. Each pair consists of one insulated conductor that bears a mark or tracer of some sort, such as a different color insulator or the like, and one insulator that is plain or that has no special marking on it. In this application, a network of only nine resistors 44 is utilized to identify each individual pair of a group of one hundred pairs, and in Figure 4 there is illustrated a method of connecting the network to the conductors so that the tracer conductor of each pair can be utilized to determine the "tens digit" of the circuit or pair number and the plain or unmarked conductor of each pair is used to determine the "units digit" of the pair number. Thus, if the tracer conductor, when tested, causes the meter 16 to read 3, for instance, and the plain or unmarked conductor gives a reading of 8 on the meter when it is contacted by the test pick 41, then the number of this pair is 38. To cause this pair 38 to read as described, it is only necessary to connect the tracer conductor to the resistance network at the point marked 3, and the plain conductor to the point on the resistance network marked 8.

In actual practice the set-up can be made as shown in Figure 4 and the following process may be utilized. At one end of the new or non-working cable 47, the sheath 48 is removed for a distance of about three feet, to gain access to the pairs of conductors within. The individual pairs are then placed, at random, through the numbered holes 46 of a standard "tag board" 45, as used by the communications industries. The ends of these pairs that extend beyond the tag board 45 are then split. That is, the tracer and plain conductors are separated. The tracer wire of all the pairs from 10 to 19 are connected to the network at the point marked 1 on the drawing. A conductor connected to this point will, when tested, cause the meter to read 1. The plain conductor of all pairs whose number includes a 1 as the units digit, is connected to the resistance network at the point marked 1. Thus, pair eleven will have both its conductors connected to a point on the network where the meter 16 will read 1 as each of the two conductors of this pair are tested.

Similarly, the tracer and plain conductors of all the other pairs are connected to the network at the proper points to cause the meter to read correctly, the tens or units digit of the pair number, as the two conductors are successively contacted by the test pick 41 at the point where it is desired to identify the various pairs. This point, from which the testing is to be done, may be anywhere along the cable 47, from a few feet to several miles from the end of the cable where the tag board 45 and the resistance network are located.

To adjust to compensate for the resistance along the conductors themselves the following procedure can be used. One pair in each group of a hundred pairs of a standard cable is given a distinctive color to set it out as the tracer pair. At the resistance network, this tracer pair, regardless of its own pair number, is connected to the point on the network at the end of the cable to the two points marked 0, shown at the lower end of the board 42. At the point from which the testing is to be done, the test clip 35 is connected to one side of the tracer pair and the test pick 41 is connected to the other side of this tracer pair. The adjustable resistance 28 is then adjusted to cause the meter 16 to read a full scale or 0 reading. The meter, in this case, is now adjusted to read the correct digit of the pair number as each of the two conductors are successively contacted by the test pick 41. The adjustment just described must, of course, be repeated each time a change is made in the point from which the testing is to be done.

In Figure 4 there is shown pairs 1, 31, 49, and tracers 50 connected to the terminal board 42.

With the test set of the present invention shorts, grounds, crosses and opens can be detected while the process of circuit identification is in progress, since any one of the aforementioned effects will affect the results of the testing to identify the circuits. In Figure 4 the test pick 41 can be moved from the solid line position to the broken line position on the tracer line when the meter is to be adjusted.

Referring to Figure 5 of the drawings there is shown a set-up that can be used for identifying the three individual wires such as the wires 51, 52 and 53 of a three wire circuit that may be of the type commonly used to furnish electricity for light, power, and heating to homes and businesses or institutions. The set-up includes a terminal board 54 having binding posts 55 and resistors 56, and conductors 57 lead from the posts 55 to clips 58 which are arranged in engagement with the lines 51, 52 and 53. The meter unit 16 is again used and the meter unit 16 can be grounded through the medium of a conductor 59, while the terminal board 54 can be grounded through the medium of a line 60. Thus, with the arrangement shown in Figure 5 each of the wires 51, 52 and 53 can be safely and positively identified at any point where they are accessible without the hazard of connecting the wires to the commercial supply voltages in order to find which circuit is which.

Referring to Figure 6 of the drawings there is shown a set-up whereby a multiple circuit wiring system in a home or plant can be connected to the circuit identifier and tester so that any of the various leads 66, 67, 68, 69, 70, 71, 72 or 73 can be readily identified at any point where they are accessible without the necessity of connecting up the dangerous voltages that will later be used to furnish electrical power over these same wires. Each of these wires may have a fuse or circuit breaker 74 interposed therein and these fuses may be opened during the testing. Also the switches 75 and 76 can be opened during the test. Again the meter unit 16 is used and there is further provided a terminal board 61 that includes a plurality of binding posts 62 and the resistors 63. Conductors 64 having clips 65 on an end thereof extend from the posts 62 to the wires 66—73 as shown in Figure 6. Wires 77 may lead from a ground bus 78 which can be grounded at 79 and 80, and the clip 35 can be connected to the ground line 80. A conductor 81 may extend from the ground bus 78 to one of the terminals 62.

The set-up shown in Figure 6 makes it unnecessary to use color coded wires for identifying circuits and in use as an example, the terminal board 61 has its number 10 binding post 62 connected to the ground bus 78 in any suitable manner as for example through the medium of the line 81. Each of the several circuits 66—73 to be identified are then connected to one each of the numbered terminal posts of the terminal board 61. Then, after the meter unit 16 has been calibrated to read full scale or 0, as described previously, the meter unit 16 may be connected between the ground wire 80 which is usually white, or any other good ground and the conductor to be identified at any point over the building such as the conductor 71. The meter 16 will then read a number that is the number of the circuit as established by the point to which the particular wire was connected to the resistance network of the terminal board. It will be seen that if the wire is not continuous back to the terminal board that no reading will be obtained on the meter. Also, if two wires are crossed together or are in contact with each other then they will both read the same on the meter and other wires whose circuit numbers are smaller numbers still will read irregular readings or inbetween numbers on the meter scale since the sequence of resistance values on the board will have been disturbed. Thus, one man without a helper can easily test and identify any circuit in the system.

The aforementioned arrangements are to be taken as only illustrative of the many possible applications of the principle of circuit identification and testing of the present invention. With the present invention the testing and identification can be accomplished easily, quickly and safely and there will be effected a saving in labor. Thus, there has been provided an extremely simple and easy to use apparatus so that one man can test for defects and at the same time identify the circuit numbers of multiple circuit wiring systems or multiple conductor cables such as telephone cables and the like.

Previously in the electrical field an ohmmeter has been used to measure an unknown resistance in a known circuit but with the present invention an ohmmeter with a known resistance is used to identify an unknown circuit so that one man testing becomes practical and easy to accomplish. Basically this invention uses known values of resistors and a meter with a source of direct current, the meter and current source being known as an ohmmeter. Thus, circuits can be identified that have been connected to a series or network of the resistors in such a manner that when the ohmmeter is connected between a common return circuit and one of the conductors to be identified, the meter will read a value that will identify the conductor under test since no two of the conductors will yield the same reading on the ohmmeter. The ohmmeter may be calibrated to read the conductor number directly or to simply indicate the number of ohms resistance in the part of the network that is in the circuit when this particular conductor is contacted for the test.

In Figure 1 the five resistors 23 are connected as shown between a tracer conductor or a common ground and each of the conductors to be identified and tested. The resistors 23 are of known value and will cause the meter 16 to read different readings as the separate conductors 17—21 are contacted by the test pick or clip 41. The number of resistors to be used and thus the number of conductors that can be identified can be changed to meet the requirements of the particular job at hand. The number used in the example is merely to illustrate the principle involved.

In Figure 1 the binding posts 15, on the terminal board 10, are connected to resistances 23 of such values as to cause the meter 16 to read a scale value that represents the circuit number.

In Figure 4 the set-up is designed especially for use on cables consisting of paired circuits wherein one conductor can be made to indicate the "tens" digit and the other conductor the "units" digit. Thus, one hundred different circuits can be identified with the use of only nine resistors 44.

It is to be further understood that the present invention can use different sizes of resistors which may be connected to the several circuits in a group and to a single common conductor in such a manner that a calibrated meter and source of direct current can be connected to the common conductor and any other individual wire so that the meter will read directly the circuit number of the individual wire under test. The device will identify each pair in a hundred pair cable and if a large cable as for example a thirty-six hundred pair, is color coded by hundreds then all thirty-six hundred pairs can be connected to the binding post chamber (resistance network) at the same time and each and every pair can be tested and positively identified as to pairs number from any opening made in the cable. The device is extremely simple and can be operated by persons without a high degree of skill. By positioning the resistors 23 within the recess 12, as shown in Figure 3, the resistors will be protected against damage, and the various parts of the board 10 may be made of any suitable material such as plastic.

In Figure 4 each pair of wires is run through a hole 46 in the tag board 45 and then the wires are connected to the terminal board 42 and to the posts 43 numbered to correspond to the two digits of the pair number. Thus, when the test pick 41 contacts the tracer side of a pair, the meter 16 will indicate the "tens" digit of the pair number. Then, as the plain conductor of the pair is contacted, the "units" digit will be indicated on the meter dial 37.

Referring to Figure 7 of the drawings, there is shown another modified arrangement. In the previously described arrangements, the basic idea was to differentiate between the circuits to be identified by connecting each of the circuits to a common source through a different amount of resistance. Thus, the difference in the resistance to each of the circuits would cause a different reading to be obtained when the several circuits were tested with a meter and a source of electrical current. However, in Figure 7, the circuits 82, 83, 84, 85, 86, 87, 88, 89, 90 and 91 which are to be tested, are differentiated by having been connected to sources of electrical voltage 92 of different magnitudes. Thus, when the circuits 82 through 91 are tested by measuring the voltages thereon, the circuits can be identified by their respective voltage readings on a volt meter 93. A clip 94 is arranged in engagement with a tracer or ground line 95, and a test pick 96 is also connected to the volt meter 93.

Referring to Figure 8 of the drawings, there is shown another modified arrangement which is similar to Figure 7, except that resistances 97 are connected between the circuits or lines 98 being tested. In Figure 8, the ground line is again indicated by the numeral 95, the volt meter by the numeral 93, and the voltage sources by the numeral 92.

Thus, it will be seen that when using the set-up shown in Figures 7 and 8 the circuits 82 through 91 or the circuits 98 can be differentiated by being connected to sources of electrical voltage 92 of different magnitudes. Thus, by measuring the voltage on the volt meter 93, the circuits can be identified by their respective voltage readings on the volt meter.

I claim:

In combination with a plurality of twisted pair conductors, a conductor identifier and tester for use by a person where the conductors are to be tested in pairs, and wherein each conductor is paired with an easily identifiable mate by being twisted together with the mate for the entire length of the cable, each pair consisting of one insulated conductor that bears an identifying mark, and one insulated conductor that is plain; said circuit identifier tester comprising a terminal board including a plurality of binding posts arranged in spaced parallel relation with respect to each other, said binding posts projecting outwardly from said terminal board, numerals arranged alongside said posts, a resistance network arranged on said terminal board and embodying a plurality of resistors connected between said posts, a tag board spaced from said terminal board and provided with a plurality of openings, there being numerals arranged alongside said openings, said openings adapted to have individual pairs of conductors extended therethrough in random fashion, and said conductors being connected to said binding posts; a meter unit including a source of current and a variable resistance, said meter unit further including a knob for controlling said variable resistance, and a dial mechanism; and a test clip and test pick connected to said conductors and to said meter unit, whereby said tester can be used for testing and determining the circuit numbers of pairs of conductors and cables made up of a multiplicity of paired conductors, a tracer conductor being connected to yield the tens digit of a circuit number as a meter indication, and the plain conductor being connected to yield the units digit of a circuit number as a further meter indication.

References Cited in the file of this patent

UNITED STATES PATENTS

| | | |
|---|---|---|
| 2,366,789 | Horham | Jan. 9, 1945 |
| 2,666,898 | Meldal | Jan. 19, 1954 |

FOREIGN PATENTS

| | | |
|---|---|---|
| 270,136 | Germany | Feb. 7, 1914 |
| 70,651 | Netherlands | Aug. 15, 1952 |
| 887,676 | Germany | Aug. 24, 1953 |